Dec. 12, 1939.　　　S. H. FLEMING　　　2,183,095
COMPARING DEVICE
Filed June 6, 1938　　　2 Sheets-Sheet 1
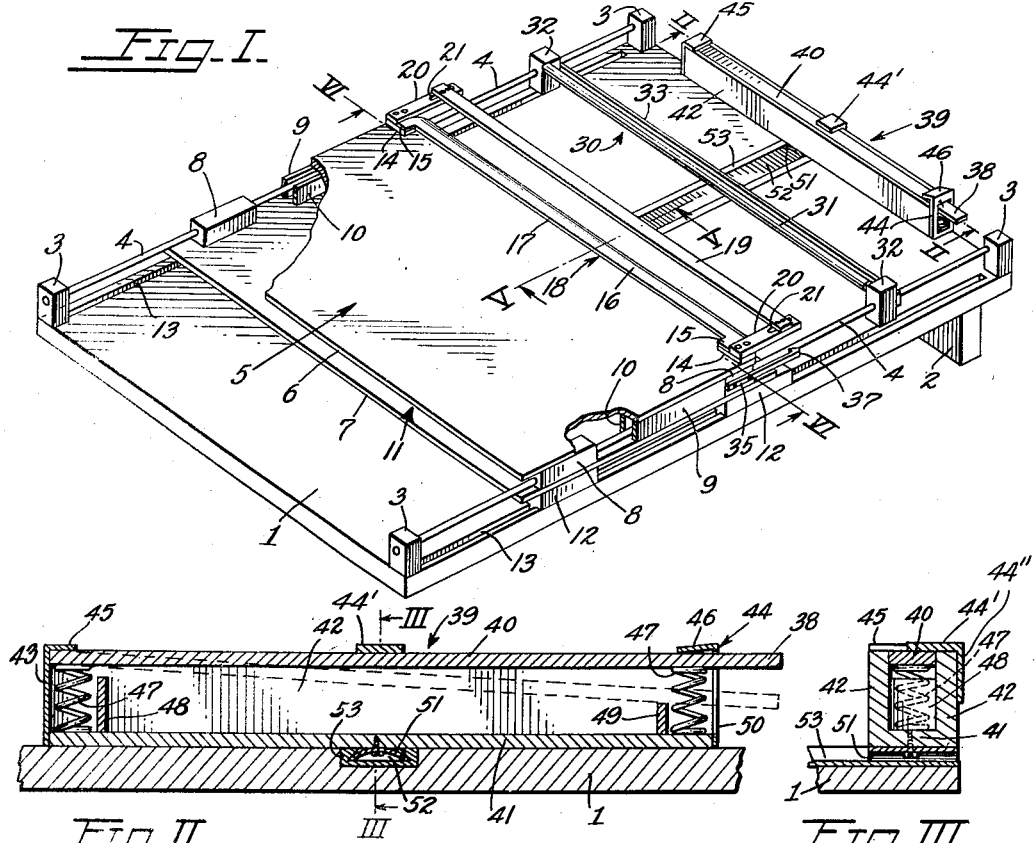
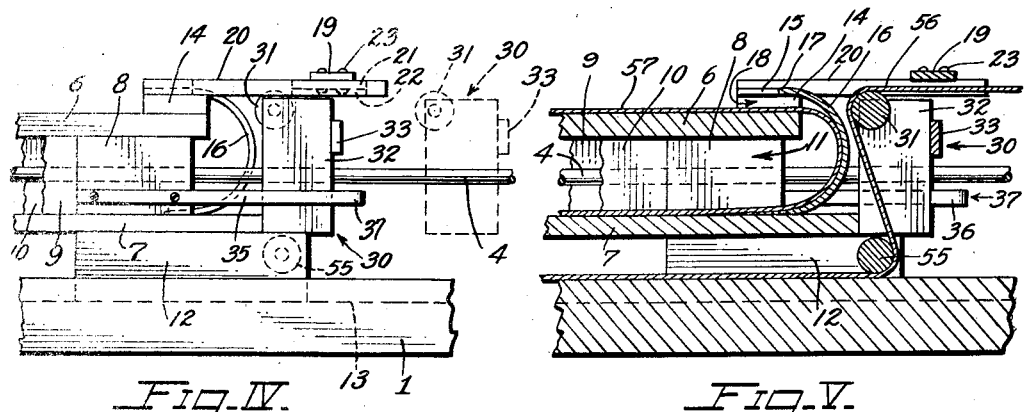
Samuel H. Fleming, Inventor Dec. 12, 1939.    S. H. FLEMING    2,183,095
COMPARING DEVICE
Filed June 6, 1938    2 Sheets-Sheet 2
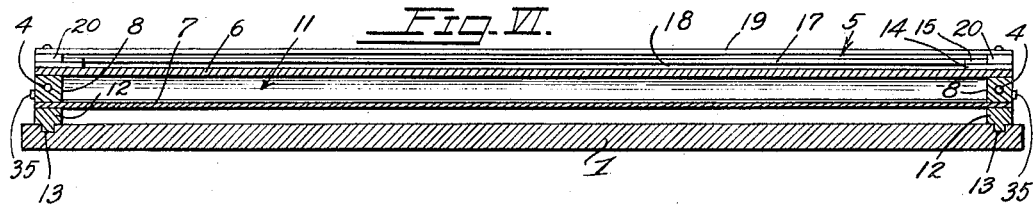
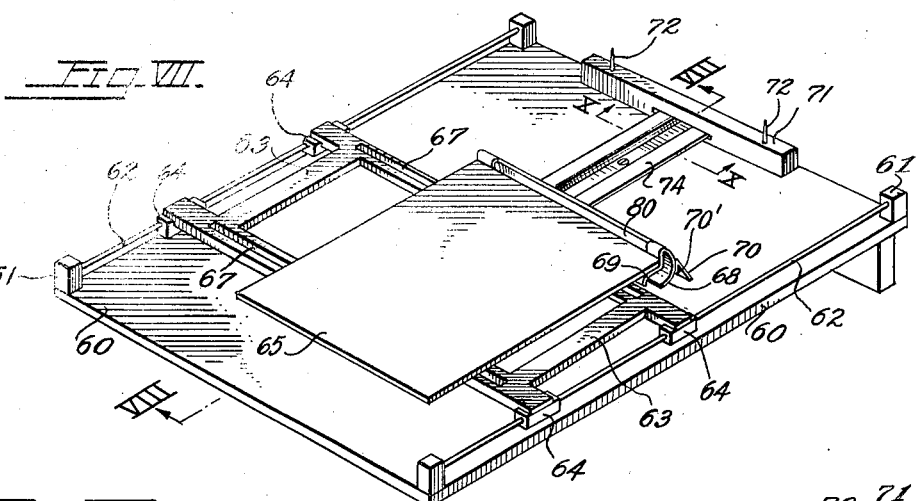
Samuel H. Fleming, Inventor Patented Dec. 12, 1939

2,183,095

UNITED STATES PATENT OFFICE 2,183,095

COMPARING DEVICE

Samuel H. Fleming, Washington, D. C.

Application June 6, 1938, Serial No. 212,116

20 Claims. (Cl. 281—1)

This invention relates to a device which in use will assist an individual in his comparison of similar reading matter carried by two sheets of paper or the like to determine whether the reading matter on one sheet is in agreement with that on the other sheet. This comparison in printing establishments is known as "proof reading."

For convenience, the expression "reading matter" will be used hereinafter and in the appended claims as a generic term to include compilations of figures, as well as compositions of words, and to include matter which is printed, typewritten or written in longhand or shorthand. The word "sheet" will also be used hereinafter and in the appended claims in a broad sense to include a sheet of paper and all other forms of material which carry "reading matter" to be compared.

Proof reading in printing establishments, at one time, was usually performed by two individuals, one of whom read aloud from an original copy or manuscript, while the other one checked a printed proof or printed copy of the manuscript contents. In printing parlance, a "proof" is a trial copy made with type after it has been composed. Two individuals were used in the proof reading as experience shows it is the most accurate method for comparing reading matter.

The tendency now with regard to proof reading is to have a single individual do the work of the two individuals referred to above. The current general practice is to have one individual read both the original manuscript and the printed proof and check the latter against the former. This current practice is a severe strain on the reader's eyes and often results in many errors. The eye strain is caused by the frequent shifting of the reader's eyes over a varying distance between the original and proof copies. The errors are generally due to the lack of a guide for directing the eye to the proper line of reading matter to be read.

It is, therefore, an object of this invention to provide a device of the character described which is useful in those cases where the comparing of reading matter is to be accomplished by a single individual, which will substantially reduce the strain on the eye of the reader, and which will materially lessen the possibility of the reader's failing to detect errors in the reading matter being checked.

Another object of the invention is to provide a comparing device which is relatively simple in construction, extremely easy to operate, and inexpensive to manufacture.

A further object is to provide a comparing device which may be used with sheets of various sizes.

A still further object is to provide a comparing device with a writing support for the sheet being checked, whereby corrections may be readily noted with a minimum interruption to the comparing operation.

Another object is to provide a device of the character described for supporting two sheets of reading matter and having means whereby the sheets can be relatively shifted to properly position the lines of reading matter which are to be read and compared at any one time, and whereby such lines during their comparison can be maintained in close proximity to each other.

Other objects will be evident from the following description, the appended claims, and the accompanying drawings which disclose and illustrate preferred embodiments of this invention.

In the drawings,

Figure I is a perspective view of a comparing device embodying this invention and shows the parts thereof in such positions that the two sheets to be compared may be readily inserted in the proper places. Parts of the device of Figure I are broken away for purposes of illustration.

Figure II is a vertical, cross-sectional view taken on lines II—II of Figure I.

Figure III is a transverse, vertical, cross-sectional view taken on lines III—III of Figure II.

Figure IV is a side elevational view, on enlarged scale, of certain details shown in Figure I, the roller guide unit being shown in its operative position in Figure IV.

Figure V is a vertical cross-sectional view taken on line V—V of Figure I, the roller guide unit being shown, in Figure V, in its operative position, and two sheets to be compared being shown in their respective comparing positions.

Figure VI is a transverse cross-sectional view taken on line VI—VI of Figure I.

Figure VII is a perspective view of another embodiment of this invention.

Figure VIII is a longitudinal cross-sectional view taken on lines VIII—VIII of Figure VII.

Figure IX is a perspective view of a detail of Figures VII and VIII.

Figure X is a detail view taken on line X—X of Figure VII.

Referring now to the drawings, the comparing device has a base 1 of wood, metal, Bakelite or other suitable material. The upper or top side of base 1 preferably has a smooth and highly polished surface to reduce friction to a minimum when a sheet is shifted along the same. The base 1 at one end may have a support 2 extending the entire width thereof. This support 2 may be secured to the base 1 as shown by Figure I in any suitable manner and maintains the same at a desired angle to the horizontal when the comparing device is placed on a flat table or the like. Each corner of the base 1 may be provided with a post 3, which is held in place by screws or other suitable means. These posts 3 support the guide rods 4 positioned adjacent the side edges of base 1.

A support 5 for a "proof" or other sheet of reading matter to be checked is shiftably mounted on the base 1. This sheet support 5 has top and bottom members 6 and 7 which are spaced apart by and suitably secured to four similar slide blocks 8. At each side of the sheet support 5 there are two slide blocks 8 which are slidably supported on the respective rod 4. If desired, the sheet support 5 may be provided with strips 9 and 10 which are inserted between the slide blocks 8 and at opposite sides of the respective rod 4 (see Figures I and V). The strips 9 serve principally as finishing pieces and contribute to the appearance of the comparing device. The strips 10 together with the slide blocks 8 and the top and bottom members 6 and 7 provide a sheet-receiving passageway 11.

The top and bottom members 6 and 7 may be formed of metal, wood, Bakelite or other suitable material, and preferably have their upper and lower surfaces smooth and highly polished, so that a sheet in contact therewith will readily slide along the same with a minimum of resistance.

To avoid lateral movement of the sheet support 5 during use, it may be provided with blocks 12 having tongues slidably disposed in grooves 13. These grooves 13 may extend between the posts 3 and below the rods 4 as shown in Figures I and VI.

The top member 6 at opposite sides thereof carries spacing pieces 14, to which are secured the ears 15 of a curved guide 16. This curved guide 16 is preferably so mounted that its upper edge 17 is spaced from and above the upper side of top member 6 to provide a slot 18. The cross-sectional shape of the guide 16 preferably is such that it curves around the end of top member 6 and into the passageway 11 (see Figure V).

A guide bar 19 is adjustably supported at its opposite ends by bracket arms 20 secured in any suitable manner to the spacing pieces 14. Each bracket arm 20 is provided with a slot 21 opening into a groove 22 (see Figure IV) of greater width. Each end of the guide bar 19 may be secured to the respective bracket arm 20 by two rivets 23, which extend through the respective slot 21 and have their lower heads slidably disposed in the respective groove 22. These rivets 23 and slots 21 permit the guide bar 19 to be readily adjusted along the bracket arm 20 and toward or away from the curved guide 16. The heads of the rivets 23 are also preferably so upset that the guide bar 19 will frictionally engage the bracket arms 20 and be maintained in any desired position of adjustment.

A roller guide unit 20 is also slidably mounted on the rods 4. This roller unit 30 comprises a roller 31 having its ends journalled in supporting blocks 32 slidably disposed on the rods 4. A bar 33, having its end portions rigidly connected in suitable manner to the blocks 32, maintains the latter in alignment across the base 1 as the bar 33, roller 31 and supporting blocks 32 move as a unit on rods 4 and lengthwise of the base 1.

The sheet support 5 and roller unit 30 are adapted to be automatically latched together when either one is moved toward the other. For this purpose, a spring latch 35 may be suitably secured to each slide block 8 adjacent the bracket arms 20. The spring latches 35 are so arranged that as the sheet support 5 and the roller unit 30 are brought together, the roller unit supporting blocks 32 engage the cam faces 36 (see Figure V) of the latches 35, force the latter apart and pass the latch heads 37. As soon as the blocks 32 contact the adjacent edge of bottom member 7, the latch heads 37 spring into latching position behind the blocks 32 (see Figures IV and V). The roller unit 30 will now move with the sheet support 5 as the latter is shifted along the rods 4. The roller unit 30 may be readily released, when desired, by manually pressing the latch heads 37 aside while the roller unit 30 is shifted from the full line to the dotted line position of Figure IV.

The comparing device also has a clamp 39 to secure a sheet of reading matter adjacent the upper end of the base 1. This clamp 39 has bottom and side walls 41 and 42, which may be of integral construction, and end plates 43 and 44. These end plates 43 and 44 have inwardly extending flanges or clamping abutments 45 and 46. A clamping bar 40 is normally maintained in engagement with these flanges 45 and 46 by coil springs 47. A partition element 48 may be provided to cooperate with the bottom and side walls 41 and 42, and the end plate 42 in retaining the spring 47 at the left of Figure II in the desired position. A partition element 49 may be provided adjacent the other spring 47 for a similar purpose. The clamping bar 40 is preferably of a width corresponding substantially to the distance between walls 41 and 42, and of a length to extend through the slot 50 in the end plate 44 and beyond the latter to provide an operating handle or arm 38. Downward movement of this handle 38 from the full line position of Figure II results in pivotal movement of the clamping bar 40 about its inner end which preferably engages both the plate 43 and the flange 45 for that purpose. When a sheet is to be placed in the clamp 39, the handle 38 is depressed to swing the clamping bar 40 from the full line to the dotted line position of Figure II. The sheet is then placed with its opposite side edges below the flanges 45 and 46. Upon release of the clamping bar 40, it will return to the full line position of Figure II under the influence of springs 47 and cooperate with flanges 45 and 46 to grip said opposite edges of the inserted sheet. According to the preferred construction of the clamp 39, the clamping bar 40, with only a slight downward movement of the handle 38, will be shifted sufficiently away from the inner edges of flanges 45 and 46 to permit the insertion or withdrawal of a sheet. The partitions 48 and 49 preferably have such height that they allow for adequate pivotal movement of the clamping bar 40 during its operation.

If desired, the clamping device 39 may be adjustably mounted on the base 1. This adjustable feature may be obtained by means of a spring metal plate 51 secured by a screw, or in other suitable manner, to the bottom wall 41 and disposed within a groove 52. This groove 52 has undercut sides, as shown in Figure II, and extends preferably along the longitudinal center of the base 1. The spring plate 51 and the sides of groove 52 cooperate to yieldingly maintain the clamp 39 in engagement with base 1 in any position of adjustment and at the same time permit manual shifting of the clamp 39 lengthwise of the base 1 when adjustment is desired. The groove 52 may be formed in a metallic bar 53 set into the base 1, as shown in the drawings, or may be formed in the base itself. Where the bar 53 is provided, it is preferable that the bar 53 and the base 1 present flush upper surfaces to avoid projecting obstructions which might interfere with movements of the sheets being compared.

The dimensions chosen for the clamp 39 would preferably be such that any sheet of ordinary width, for example legal size paper or business writing paper, might be suitably held between the clamping bar 40 and the abutments or flanges 45 and 46. For sheets of odd or different width, I provide a third abutment 44' located approximately at the center of the clamp 39. This abutment 44' is supported by a depending leg 44" which is secured to the rear clamp side wall 42, that is, the one at the right in Figure III. The abutment 44' overlies at least a portion of the clamping bar 40 so that the two may cooperate to grip the upper edge of a sheet inserted below the abutment 44'. The handle 38 is operated in the same manner as described above, if the abutment 44', instead of the abutments 45 and 46, is to cooperate with clamping bar 40 to grip an inserted sheet. In the event the inserted sheet is to be secured beneath the abutments 45 and 46, the sheet may overlie the abutment 44'. If the width of the sheet is greater than the length of the clamp 39, such sheet may be gripped between the abutment 44' and the clamping bar 40 and extend over the abutments 45 and 46.

Operation of first embodiment

In preparing the comparing device of Figures I to VI for use, the clamp 39 may be arranged adjacent the top edge of base 1, the sheet support 5 may be positioned adjacent the lower edge of base 1, and the roller unit 30 is separated from the sheet support 5 as shown in Figure I. The preferred position for the roller unit 30 at this time would be adjacent the clamp 39. A sheet, such as the copy of a printing establishment, is then secured adjacent its upper edge in the clamp 39. If the copy is of a certain size, it may have its opposite side edges gripped between the abutments 45 and 46 and the clamping bar 40. In other cases, the copy may have its end edge gripped between abutment 44 and clamping bar 40.

The remainder of the copy sheet is passed over the top of roller unit 30, under a roller 55 rotatably mounted in two of the blocks 12, and below sheet support 5. The sheet support 5 is next shifted toward and into engagement with the roller unit 30. During this shifting movement, the sheet support 5 and the roller unit 30 will be automatically latched together as shown in Figures IV and V. The copy sheet 56 is now in the position illustrated by Figure V, and its reading matter may be scanned through the space between guide 16 and bar 19. To further facilitate this scanning, the roller 31 is preferably supported as illustrated in Figure V. It will be noted that the roller 31 positions the copy sheet 56 in close proximity to guide bar 19 and in the plane of bracket arms 20. The roller 31 is also preferably arranged closely adjacent to the curved guide 16. The guide bar 19, according to preferred practice, is adjusted in such position that only a single line of reading matter may be completely in view at any one time through the space between bar 19 and guide 16.

The proof or sheet of reading matter 57 (see Figure V) to be compared with copy 56 is placed on the top of sheet support 5 and shifted toward curved guide 16 until the upper edge of the proof 57 passes into slot 18 and the top or first line of the proof 57 is closely adjacent and about to pass under the edge 17. With the proof 57 in this position of adjustment, the eye of the reader will be guided by the edge 17 as the top line of the proof 57 is scanned.

The sheet support 5 may now be shifted in the direction away from clamp 39. Due to this movement of sheet support 5, the copy 56, since it is secured at its upper portion to clamp 39, is fed around roller 55, over roller 31 and under guide bar 19. The movement of sheet support 5 may be discontinued when the top line of the copy 56 is in view between the roller 31 and guide bar 19. The guide bar 19 now assists the reader in viewing the line of reading matter of the copy to be scanned in the same manner as the edge 17 aids the reader in reading the proof 57.

For purposes of describing this invention the proof 57 is assumed to be a line for line reproduction of copy 56, and the comparing operation is assumed to begin by comparing the first line of the proof 57 with the first line of copy 56. It will be readily understood, however, that the comparing device of this invention is for general use in comparing operations and is not limited in use to any particular type of comparing operation.

The close proximity of the first line of the copy 56 and the first line of the proof 57, as well as the guide bar 19 and guide edge 17, will aid the eye of the operator in quickly and accurately reading these lines being compared. The eye will have only a short distance to travel in passing from the copy 56 to the proof 57 and back to the copy 56. It is also to be noted that the guide edge 17 and the guide bar 19 will always be in position to assist the reader in scanning the proper line of the respective sheet. This arrangement reduces eye strain and aids in securing greater accuracy during checking operations.

After the first line of the proof 57 is checked against the first line of copy 56, the sheet support 5 is shifted away from the clamp 39 a sufficient distance to bring the next adjacent line of copy 56 into view between the bar 19 and the guide 16. This shifting movement may be readily accomplished by the left hand of the operator at the same time it is shifting proof 57 to bring the second line thereof in reading position closely adjacent edge 17. The second lines of the copy 56 and proof 57 may now be compared.

This shifting of sheet support 5 and proof 57 is repeated after each line of the proof 57 is checked and may be so quickly performed that there need be no appreciable interruption in the reading by the operator as the checking progresses along the copy 56 and the proof 57.

The comparing device of this invention is relatively simple and easy to operate. These features enable the operator to keep his writing hand free to hold a pencil or pen and to make corrections directly on the proof 57 during and without interruption to the comparing operation. Furthermore, the relatively large upper surface of the sheet support 5 facilitates the making of notes on the proof 57 during the comparing operation.

If the copy 56 is of such length that all of its reading matter does not come into view between the guide bar 19 and curved guide 16 during movement of the sheet support 5 to the lower end of board 1, the sheet support 5 may be returned to the other or upper end of the board 1 and the copy adjusted to a new position in clamp 39. The comparing operation may now be continued to complete the checking of the proof 57 in the same manner as described above.

As the successive lines of the proof 57 are read, the proof 57 is progressively shifted into the slot 18 and guided into passageway 11 by the curved guide 16. For this purpose, the guide 16 preferably has such curvature in cross-section as will offer the least resistance to advancement of the proof into slot 18, and at the same time will properly guide the paper into passageway 11. It will also be noted that this passageway 11 is designed to avoid interference with the desired shifting movement of the proof 57 as well as interference between the copy 56 and proof 57.

The second embodiment

A second embodiment of this invention is illustrated by Figures VII through X. As in the previously described embodiment, the comparing device has a base 60, posts 61 and guide rods 62. These guide rods 62 slidably support the blocks 64, on which a carriage 63 is mounted. A writing or sheet support 65 is mounted on this carriage 63. Two strips 66 may be secured to the underside of the sheet support 65 and received within the slots 67 provided in the carriage 63. The slots 67 are of greater length than the strips 66 to permit the sheet support 65 to be shifted or adjusted across the base 60. The strips 66, however, provide such connection between the carriage 63 and the sheet support 65 that they move together when either is shifted lengthwise of the base 60.

The sheet support 65 is also provided at one end with paper guide means which also guide the reader's eyes in the comparing operation. These means comprise curved guides 68 and 69 which extend from opposite sides of a slot 80. The curved guides 68 and 69 may be formed from a single plate of sheet metal by any suitable stamping, bending and shaping operation, the sheet metal being also cut to provide the slot 80. A bar 70 which constitutes a line guide for reading, has a flange 70 welded or otherwise secured to the curved guide 68.

A sheet or copy holder is mounted on the base 60 and preferably adjacent the top edge thereof. This copy holder comprises a bar 71 having upstanding pins 72 on which "copy" may be temporarily impaled. To adjustably secure the copy holder to the base 60, the bar 71 has a slot 73, T-shaped in cross-section, to slidably receive a guide strip 74. This guide strip 74 which may be formed of spring metal or other suitable material, has its longitudinal center portion secured, as by means of screws, to the base 60 and its side portions extending into the opposite recesses of the slot 73 in bar 71. The strip 74 by its engagement within slot 73 yieldingly maintain the bar 71 in any desired position of adjustment and also permits manual shifting of the bar 71 lengthwise of the base 60 as well as tilting of the bar in a plane parallel to that of the base 60 to suitably position copy or other sheet material held by the pins 72.

Operation of second embodiment

A sheet of copy matter or manuscript is impaled on the pins 72 of the bar 71, which preferably is initially positioned adjacent the top edge of the base 60. The lower part of the copy is passed below the line and curved guides 70, 68 and 69 and lies flat on the base 60. The proof or sheet to be compared is arranged on sheet support 65 and shifted through slot 80 until the top line of the proof is about to pass into the slot 80. The top edge of the slot 80 will now assist the reader's eyes in their scanning of the top line of the proof. The sheet support 65 and its carriage 63 are also shifted toward the copy holder pins 72 until the lower edge of the bar 70 is just below the top line of the copy. Comparing of the top lines of the proof and copy may now be accomplished with comparative ease, as these lines are closely adjacent to each other as well as to edges which direct the reader's eyes to the proper lines to be read. After each line of reading matter is checked, the sheet support 65 is shifted away from the pins 72 to bring a new line of reading matter of the copy into reading position adjacent the lower edge of bar 70. The proof on sheet support 65 is also shifted toward slot 80 until the first line of reading matter has passed therethrough and the second line is about to enter the slot 80. The second lines of the proof and copy may now be conveniently compared. This shifting of the sheet support 65 and the proof thereon continues until checking of the reading matter is completed. As the proof passes beyond the slot 80, its direction of movement is reversed by the curved guide 68, which directs the proof to a position below the sheet support 65. The curved guide 69 serves to deflect the proof towards the base 60 after the proof passes the curved guide 68.

Lateral adjustment of the sheet support 65 relative to its carriage 63 is desirable when the proof impaled on pins 72 contains a plurality of columns of reading matter and only one column at the time is to be checked against the proof. The guide strip 74 might also be extended beyond the top edge of base 65, so that the copy holder bar 71 and pins 72 may accommodate copy of greater length.

It is also to be understood that the copy holder means 71 through 74 may be used with the comparing device of Figures I through VI and that the clamp 39 may be used with the comparing device of Figures VII through X.

The foregoing is only illustrative, and it will be understood that this invention includes all embodiments and modifications coming within the scope of the appended claims.

I claim:

1. In a device of the character described for comparing reading matter on separate sheets, the combination comprising a substantially flat rectangular base, holding means adjacent the top end of said base for one of said sheets, a rod arranged adjacent and along each side of said base, means slidably mounted on said rods and including a substantially flat surface to provide a writing support for the other sheet, said slidably mounted means being shiftable toward said holding means and over said first sheet to prepare the device for a comparing operation and away from holding means in a comparing operation, means providing adjacent the top end of said slidably mounted means a guide edge to assist reading of the matter on said second sheet of material and a guide for leading said second sheet to a position below said writing surface as said second sheet is shifted over said writing support to bring successive portions thereof into reading position adjacent said guide edge, and means associated and movable with the top end of said slidably mounted means and providing a guide to assist reading of said first sheet.

2. In a device of the character described, paper clamping means comprising an elongated body portion having side and bottom walls, an abutment adjacent each end of said body portion and extending between the side walls thereof, a bar extending along and between said side walls and below said abutments with one end of the bar extending beyond an end of said body portion to provide an operating arm, and spring means interposed between said bar and said bottom wall, whereby a sheet of material may have opposite edge portions thereof interposed between said abutments and said bar upon operation of said arm and clamped therebetween upon release of said arm.

3. In a device of the character described, a base, a carriage mounted for adjustment lengthwise thereof, a sheet and writing support mounted on said carriage for adjustment laterally thereof, sheet and reading guide means adjacent the upper end of the sheet and writing support, and paper holding means adjacent the upper end of said base.

4. In a comparing device of the character described, a base over which a sheet of reading matter may be placed, means for securing at least a portion of said sheet to said base, means including a writing support for a second sheet and a reading guide edge, said support and guide means being slidably mounted on said base for moving said edge down said first sheet, and sheet guide means adjacent said reading guide edge, said sheet guide means being so arranged and designed as to receive the near edge of said second sheet as the latter is shifted toward said sheet guide means, to reverse the direction of movement of said second sheet, and to lead said second sheet to an out-of-the-way position below said support as the shifting of said second sheet is continued.

5. In a device of the character described, a base on which a sheet is to be supported, a carriage mounted for adjustment lengthwise thereof, means on said carriage to provide a writing support for a second sheet, and reading guide means for both of said sheets, said reading guide means being movable with said carriage and arranged adjacent the top end of said writing support.

6. In a device for receiving and supporting two sheets of material to be compared line by line, the combination comprising a base to which one of said sheets is to be secured, and a carriage shiftable over said base and away from the top edge of said sheet as the lines thereon are read in succession, said carriage having at the top end thereof a reading guide so arranged as to be closely adjacent each of said lines as it is read, said carriage also having a substantially flat surface for receiving the other of said sheets in writing position and a second reading guide adjacent said carriage top end, said second sheet being freely slidable on said surface for bringing each of the lines on said sheet closely adjacent said second reading guide as it is read.

7. A device as defined in claim 6, in which the carriage and base are relatively arranged to provide space therebetween for said first sheet, and said carriage moves over said first sheet to uncover the lines thereon in the normal order for reading.

8. A device as defined in claim 6 in which the carriage includes a passageway, and means for guiding the upper portion of said second sheet into said passageway as the lower portion is shifted on said substantially flat surface and toward said second reading guide.

9. A device as defined in claim 6, in which the base has sheet securing means adjacent the top end thereof, a roller unit is slidably mounted on said base for movement between said securing means and said carriage, and means are provided for automatically latching said roller unit to said carriage as they are relatively shifted into engagement with each other, the roller of said unit when the latter is in the latched position being adapted to support said first sheet in position closely adjacent said first reading guide.

10. A device as defined in claim 6, in which said second reading guide is spaced from said substantially flat surface to provide an opening for receiving said sheet as it shifted toward said second reading guide, and means is provided for reversing the direction of said second sheet after passing said opening and guiding the said second sheet to a position below said substantially flat surface.

11. A device as defined in claim 6, in which the first reading guide is adjustably mounted to provide one side of an opening through which said first sheet may be viewed in the comparing operation, and a roller for supporting said first sheet is arranged adjacent said opening.

12. A device of the character described comprising a base to support a sheet, a carriage mounted on said base and movable toward the lower end thereof to expose successive portions of said sheet beginning with the upper portion thereof, said carriage providing the sole support for a second sheet and having an upper writing surface on which said second sheet is initially positioned, and guide means mounted on said carriage adjacent its top end, said guide means being constructed and arranged to receive the top edge of said second sheet as said second sheet is shifted on said writing surface toward said guide means and to guide said second sheet edge to a position below said writing surface.

13. A comparing device of the character described comprising:—a base on which a sheet of reading matter may be placed; means adjacent the upper end of said base for securing a portion of said sheet thereto; means slidable over said base and first sheet and relative to said securing means, and providing a writing support for a second sheet; reading line guides for said respective sheets, said guides being carried by said slidable means adjacent the top end thereof, a sheet receiving passageway below said writing surface, and a guide element mounted on said slidable means adjacent said reading line guides for engaging said second sheet as it passes the respective line guide and directing the same into said passageway.

14. A comparing device as defined in claim 13, in which a roller unit is mounted on said base for movement between said slidable means and securing means, and flexible latch means are provided on said slidable means to secure said roller unit thereto for movement therewith over said base, said roller unit being separable from said slidable means to permit an intermediate portion of said first sheet to be placed over said roller unit with a lower portion of the first sheet extending beneath said slidable means, said roller unit being adapted to be then latched to said slidable means to support an engaged portion of said first sheet in reading position relative to its respective line guide.

15. A comparing device as defined in claim 13 wherein the reading line guides are adjustable relative to each other.

16. A comparing device as defined in claim 13 wherein the sheet securing means is adjustably secured to said base for movement therealong.

17. A comparing device as defined in claim 13 wherein the sheet securing means comprises laterally spaced, inwardly extending abutments under which opposite edge portions of the first sheet may be placed, and a spring pressed bar underlying and extending between said abutments for clamping said first sheet thereto, said bar having one end extending laterally of the sheet securing means for manual operation whereby the bar may be pivotally swung about its other end to permit insertion or withdrawal of said first sheet from said sheet securing means.

18. A comparing device of the character described comprising a base on which a sheet of reading matter is to be placed, means for securing at least a portion of said sheet to said base, means slidable over said base and providing a writing support for a second sheet of paper, two reading guide means mounted on said slidable means adjacent the top end thereof and adapted to overlie respectively said first and second sheets in the comparing operation, a roller unit slidably mounted on said base and between the top ends of said base and slidable means, and means for latching said roller unit to said slidable means whereby they will move together during shifting of said slidable means, said roller unit being separable from said slidable means to permit said first sheet to be placed partly over said roller and partly between said slidable means and base, said roller unit when latched to said slidable means with said first sheet in place supporting an engaged portion thereof in reading position relative to the respective reading guide means.

19. For use in a comparing device of the character described, paper clamping means comprising a body portion, inwardly extending clamping abutments carried by said body portion, a clamping bar extending under and between said clamping abutments and projecting from said body portion to provide an operating handle, and means urging said clamping bar into engagement with said abutments and providing pivotal movement of said clamping bar about the inner end thereof during movement of the bar end forming said operating handle.

20. Paper clamping means as defined in claim 19 wherein a third clamping abutment is carried by said body portion and intermediate said inwardly extending abutments, said third abutment having a supporting portion extending downwardly at the side of said clamping bar and a flange portion overlying and engaging said clamping bar in its idle position.

SAMUEL H. FLEMING.